(12) United States Patent
Wang et al.

(10) Patent No.: US 8,459,124 B2
(45) Date of Patent: Jun. 11, 2013

(54) AUTOMOBILE GENERAL PRESSURE SENSOR

(75) Inventors: Wenxiang Wang, Kunshan (CN); Bing Wang, Kunshan (CN); Chaomin Mao, Kunshan (CN); Qiao Shi, Kunshan (CN); Wei Li, Dongjing Town (CN); Chao Wang, Dongjing Town (CN)

(73) Assignee: Kunshan Shuangqiao Sensor Measurement Controlling Co., Ltd., Zhouzhuang (CN)

( * ) Notice: Subject to any disclaimer, the term of this patent is extended or adjusted under 35 U.S.C. 154(b) by 236 days.

(21) Appl. No.: 13/105,261

(22) Filed: May 11, 2011

(65) Prior Publication Data

US 2011/0290032 A1      Dec. 1, 2011

(30) Foreign Application Priority Data

May 31, 2010   (CN) .......................... 2010 1 0187894

(51) Int. Cl.
    *G01L 9/06*           (2006.01)
(52) U.S. Cl.
    USPC .................................. 73/727; 73/700; 73/753
(58) Field of Classification Search
    None
    See application file for complete search history.

(56) References Cited

U.S. PATENT DOCUMENTS

| | | | |
|---|---|---|---|
| 5,186,055 A * | 2/1993 | Kovacich et al. | 73/727 |
| 6,247,369 B1 * | 6/2001 | Chapman et al. | 73/726 |
| 6,588,281 B2 * | 7/2003 | Kurtz et al. | 73/754 |
| 6,595,067 B2 * | 7/2003 | Suzuki et al. | 73/754 |
| 6,813,956 B2 * | 11/2004 | Kurtz et al. | 73/754 |
| 6,877,380 B2 * | 4/2005 | Lewis | 73/715 |
| 7,093,493 B2 * | 8/2006 | Benzel et al. | 73/715 |
| 7,287,433 B2 * | 10/2007 | Tanaka | 73/727 |
| 7,320,250 B2 * | 1/2008 | Ueno | 73/754 |
| 7,370,536 B2 * | 5/2008 | Ueyanagi et al. | 73/754 |
| 7,401,521 B2 * | 7/2008 | Bellini et al. | 73/706 |
| 7,412,894 B2 * | 8/2008 | Ueyanagi et al. | 73/753 |
| 7,775,119 B1 * | 8/2010 | Suminto et al. | 73/727 |

* cited by examiner

*Primary Examiner* — Freddie Kirkland, III
*Assistant Examiner* — Jermaine Jenkins
(74) *Attorney, Agent, or Firm* — Vierra Magen Marcus LLP

(57) ABSTRACT

A general pressure sensor for an automobile comprising a sensor shell, a silicon piezoresistive sensitive core, a sensor core seat, a signal conditioning circuit, and an automobile electric device interface is disclosed. The silicon piezoresistive sensitive core, the sensor core seat and the signal conditioning circuit are disposed in the inner cavity of the sensor housing. The sensor housing is installed to the automobile electric device interface, and the silicon piezoresistive sensitive core comprises a silicon piezoresistive sensitive element and a glass ring sheet. The silicon piezoresistive sensitive element is welded and fixed to a surface of the glass ring sheet. An insulation oxidation layer is formed on one surface of the glass ring sheet and the silicon piezoresistive sensitive element. The other surface of the glass ring sheet is hermetically fixed to the ring-shape recession surface provided on the sensor core seat. The sensor core seat is hermetically and rotationally fixed to a pressure inlet on the sensor housing, after the inner lead wire on the silicon piezoresistive sensitive core is led to an interposing board provided on one end of the central hole through the other end of the central hole on the ring-shape recession surface of the sensor core seat, and then is led out by the automobile electric device interface via the signal conditioning circuit.

16 Claims, 3 Drawing Sheets

AUTOMOBILE GENERAL PRESSURE SENSOR

PRIORITY CLAIM

This application claims priority under 35 U.S.C. 119 to Chinese Patent Application No. 201010187894.1, filed May 31, 2010, which is incorporated herein by reference.

FIELD OF THE INVENTION

This invention relates to a general pressure sensor for an automobile, and more particularly, relates to a general pressure sensor for an automobile based on silicon-based MEMS technology. The sensor can be used for pressure measurement for media such as oil pressure, gas pressure, fuel, refrigerant, liquid pressure and the like in various automobiles and respective vehicle systems.

BACKGROUND

As one of the information sources of an automotive electronic control system, the general purpose pressure sensor for an automobile is a critical part of the automotive electronic control system, and also is one of the core contents of the research on the technical field of automotive electronics. The general pressure sensors for an automobile are mainly used for the control of pressure measurement of parts such as brake systems, automatic transmissions, air-conditioning systems, suspension systems, engine oil pressure, power switching transmission systems, engine direct injection pressure, LPG and CNG systems and the like in automobiles.

In the 1980s, traditional automotive high pressure sensors used thick film ceramic technique. With the development of many years, the cost for manufacturing ceramic core has been reduced significantly these days and the price meets the requirements of automotive application. However, due to its high brittleness, ceramic materials are poor in resistance to overload of liquid pressure impact (generally with a overload capacity of only 1.5~2 times of static pressure), and poor in vibration resistance, low in reliability and low in output sensitivity (2 mV/V), so that it is confronted with elimination as it could not meet the development needs of the pressure measurement in automobiles.

In the 1990s, there also appeared automotive high pressure sensors using strain technology, which still remained low cost property for core manufacturing, but solved the problem of poor vibration resistance of the thick film ceramic and improved the ability to resist the pressure impact overload at the same time. However, since the structural principle of the sensor used an adhesive metal strain technology, the fatigue of the organic adhesive resulted in a shorter lifetime of the whole sensor, and measuring accuracy degraded with the time of usage due to creep of the adhesive, and meanwhile, the sensitivity output was still very low.

Recently, Measurement Specialties Inc. of America and Sensata of America have made improvements for the above described strain technology by replacing the adhesive strain gage technology with high temperature glass powder sintered silicon strain gage technology. Despite the slight increase of the core manufacturing cost, it solves the problem of lifetime and measuring accuracy of the sensor which varies with time, and the utilization of silicon strain gage increases sensitivity output significantly at the same time. However, in the glass powder sintering process, the area is relatively large due to the thinness of the glass powder layer, for a glass material which is relatively fragile, when it is subjected to rapid pressure overload impact and temperature impact, rupture will occur in the sintered glass layer, and its pressure overload impact resistance generally still remains only two times, and the operating temperature range is only −20~80° C., thus it can not meet operating requirements of the automobile level in many aspects. Also, at the later stage, the disadvantage of above described strain mode was solved by sputter thin film mode general pressure sensor which is derived from the strain mode. The operating temperature region could also meet requirements of the automobile level, and the sensitivity output could reach 5 mV/V and the resistance of impact pressure overloads two times. However, due to its relatively high manufacturing cost, it can not be popularized in automotive application in a wide range.

Companies such as KELLER of Europe and Honeywell of America use MEMS monocrystalline silicon sensitive element, where the sensitivity output could be up to 20 mV/V and the resistance of impact pressure overloads 3 times, on the premise of satisfying the application of automobile level. Although a relative batch manufacturing of sensitive elements with low cost is achieved by utilizing semiconductor MEMS process, because the international general design of the monocrystalline silicon general pressure sensor chip is a structure where the rear surface supports the chip and the front surface bears pressure, among them a complex isolating oil-filled welding technique is needed to meet the compatibility requirement of the measuring medium. Thus the manufacturing cost of the products is increased significantly, and therefore it can not be popularized in automotive applications in a wide range.

SUMMARY OF THE INVENTION

To solve the above described problems, one aspect of the present invention provides a general pressure sensor for an automobile having the properties of high measuring accuracy and low cost, which can meet the measuring requirement of pressure such as oil pressure, gas pressure, fuel, refrigerant, liquid pressure etc., and the installation is convenient and reliable.

The technique solution of the aspect of the invention is achieved as below: a general pressure sensor for an automobile comprises a sensor housing, a silicon piezoresistive sensitive core, a sensor core seat, a signal conditioning circuit and an automobile electric device interface, and the silicon piezoresistive sensitive core, the sensor core seat and the signal conditioning circuit are disposed in the inner cavity of the sensor housing, and the sensor housing is installed to the automobile electric device interface.

The silicon piezoresistive sensitive core comprises a silicon piezoresistive sensitive element and a glass ring sheet. The silicon piezoresistive sensitive element comprises a silicon film sheet which is covered with a silicon oxide layer and a silicon nitride layer in turn. The middle part of the front surface of the silicon piezoresistive sensitive element is provided with a Wheatstone bridge, while after the silicon film sheet is exposed in the surrounding part of the front surface, the silicon piezoresistive sensitive element is solidly welded to one surface of the glass ring sheet of which the thermal expansion coefficient is similar to silicon. The strain resistance on the Wheatstone bridge is led out via a welded inner lead wire. An insulation oxidation layer is formed on the front surface of the silicon piezoresistive sensitive element and the glass ring sheet.

The other surface of the glass ring sheet is hermetically fixed to a ring-shape recession surface which is provided on the sensor core seat. The sensor core seat is hermetically and rotationally fixed to a pressure inlet on the sensor housing. The inner lead wire on the silicon piezoresistive sensitive core is led to an interposing board provided on one end of the central hole via the other end of the central hole on the ring-shape recession surface of the sensor core seat, and then the inner lead wire on the silicon piezoresistive sensitive core is led out by the automobile electric device interface via the signal conditioning circuit.

The sensor housing comprises a sensor base and a sensor shield which is rotationally fixed to the sensor base and then forms an inner cavity. The sensor shield is installed to the automobile electric device interface, and the middle part of the sensor base has a stepped hole which acts as the pressure inlet, and the sensor core seat is rotationally fixed to the stepped hole on the sensor base by means of thread sealant.

As a further improvement of the invention, the circumferential surface of the stepped hole has a ring-type recession, and the ring-type recession is provided with an O-type sealing ring, while the sensor core seat is rotationally fixed to the stepped hole of the sensor base, the sensor core seat tightly presses the O-type sealing ring. Thus the hermitical fixation between the sensor core chassis and the sensor base is achieved.

As a further improvement of the invention, the signal conditioning circuit board provided with the signal conditioning circuit is fixed to the inner cavity of the sensor housing, and the signal conditioning circuit comprises a signal amplification circuit, a zero-position and full-scale output conditioning circuit, a zero-position and sensitivity temperature coefficient compensation circuit, and a non-linear trim circuit.

As a further improvement of the invention, the pressure measuring range corresponding to the sensor is 0~0.5 MPa to 0~100 MPa, and the diameter and the thickness of the round flat silicon film sheet is 2 mm~4 mm and 0.22~0.91 mm, respectively.

As a further improvement of the invention, the inner wall of the glass ring sheet and the inner wall of the central hole on the sensor core seat are provided with an adhesive silicone rubber as an insulation surface.

As a further improvement of the invention, the sensor shield is rotationally fixed to the automobile electric device interface by means of sealant, a ring-type connection seam between the sensor core seat and the sensor base, and a ring-type connection seam between the sensor shield and the sensor base are hermetically welded by means of laser or electron beam.

As a further improvement of the invention, the sensor core seat, the sensor base and the sensor housing are made of stainless steel material.

As a further improvement of the invention, Pyrex 7740 or GG-17 glass ring sheet is employed for the glass ring sheet.

A beneficial technical effect of the invention is in that the Wheatstone bridge is provided on the front surface of the silicon piezoresistive sensitive element, while the rear surface acts as a pressure bearing surface. By doing so, the pressure of the outside media is brought in through the pressure inlet and the rear surface of the silicon piezoresistive sensitive element bears pressure. Thus the impact from the outside media is reduced.

Also, the silicon piezoresistive sensitive element is hermetically fixed to the sensor core seat through the glass ring sheet, while the sensor core seat is in turn hermetically fixed to the inner side of the pressure inlet of the sensor housing, while the sensor housing is composed of a sensor base and a sensor shield which is rotationally fixed to the sensor base and then forms an inner cavity, the sensor shield is installed to the automobile electric device interface, and there is a stepped hole as a pressure inlet in the middle part of the sensor base, and the sensor core seat is rotationally fixed to the stepped hole on the sensor base by means of thread sealant. By doing so, the sealing property among the glass ring sheet, sensor core seat, sensor base and sensor shield is ensured while manufacturing the sensor by means of a plurality of measures, thus the measuring reliability is ensured.

Further, an insulation oxidation layer is formed on the front surface of the glass ring sheet and the silicon piezoresistive sensitive element. Thus the measuring accuracy is improved, and signal amplification, zero-position and full-scale output conditioning, zero-position and sensitivity temperature coefficient compensation and non-linear trimming are realized by introducing the signal conditioning circuit. Thus it fully meets the requirements of the automotive high pressure measurement.

BRIEF DESCRIPTION OF THE DRAWINGS

In order to make the aforementioned objects, characteristics and advantages of the present invention more apparently and readily to appreciate, a detailed description of the embodiments of the present invention will be given in conjunction with the accompanying drawings in which.

ILLUSTRATION FOR REFERENCE NUMBERS OF ELEMENTS IN THE DRAWINGS

1—silicon piezoresistive sensitive element
11—round and flat silicon film sheet
12—$SiO_2$ layer
13—$Si_3N_4$ layer
14—strain resistance
15—spun gold inner lead wire
2—glass ring sheet
3—sensor core seat
4—interposing board
5—sensor base
51—O-type sealing ring
6—sensor shield
7—automobile electric device interface
8—leading out cable core wire
91, 92—ring-shape connecting seam
10—thread sealant
101—signal conditioning circuit board

DETAILED DESCRIPTION

A further description of the embodiments of the invention will be given in conjunction with FIGS. 1, 2, 3, 4, and 5 respectively in the followings.

An automobile general pressure sensor comprises a sensor housing, a silicon piezoresistive sensitive core, a sensor core seat, a signal conditioning circuit and an automobile electric device interface. The silicon piezoresistive sensitive core, sensor core seat and signal conditioning circuit are disposed in the inner cavity of the sensor housing. The sensor housing is installed to the automobile electric device interface, and the signal conditioning circuit board 101 provided with the signal conditioning circuit is fixed to the inner cavity of the sensor.

Figure 1:
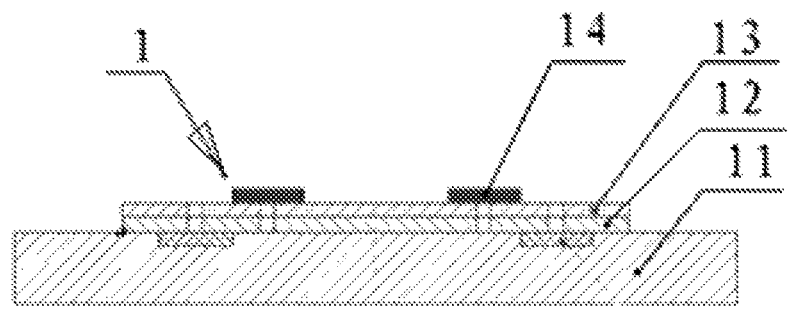
FIG. 1 is a schematic view of the structure of the silicon piezoresistive sensitive element of an embodiment of the invention.
Figure 2:
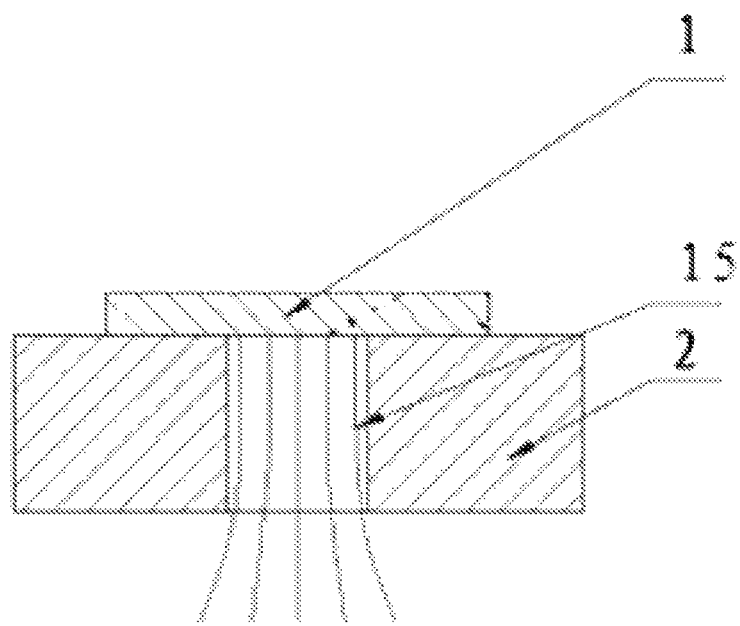
FIG. 2 is a schematic view of the structure of the silicon piezoresistive sensitive core of an embodiment of the invention.

As shown in FIG. 1 and FIG. 2, the silicon piezoresistive core is composed of piezoresistive sensitive element 1 and glass ring sheet 2. The piezoresistive sensitive element 1 includes a round-shape and flat silicon film 11 the front surface of which is, in turn, covered with a silicon oxide ($SiO_2$) layer 12 and a silicon nitride ($Si_3N_4$) layer 13. A middle part of the front surface of the silicon piezoresistive sensitive element 1 (i.e., silicon nitride layer 13 surface) is provided with a Wheatstone bridge, while after the silicon film sheet is exposed in the surrounding part of the front surface, the piezoresistive sensitive element 1 is solidly welded to a glass ring sheet 2 of which the thermal expansion coefficient is similar to silicon. The strain resistance 14 on the Wheatstone bridge is led out via welded spun gold inner lead wire 15, the rear surface is subjected to pressure, and thus the influence of the outside media is reduced. Semiconductor low temperature anode oxidation insulation process is implemented to the front surface of the glass ring sheet 2 and the piezoresistive sensitive element 1 to form an insulation oxidation layer.

Figure 3:
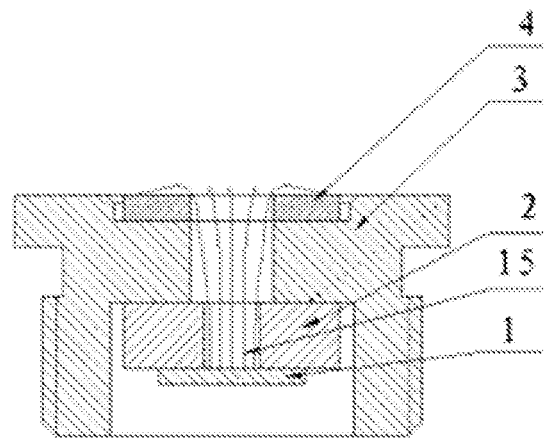
FIG. 3 is a schematic view of the assembly of the silicon piezoresistive sensitive core and sensor core seat of an embodiment of the invention.
Figure 5:
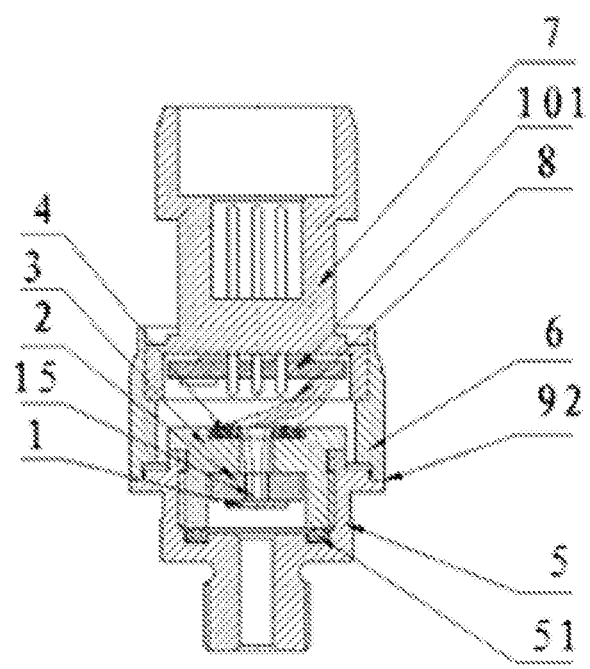
FIG. 5 is a schematic view of the structure of the automobile general pressure sensor of an embodiment of the invention.

As shown in FIG. 3, the other surface of the glass ring sheet 2 (unpolished rough surface, upper surface as seen from the angle of FIG. 3) is hermetically fixed to the ring-shape recession surface provided on the sensor core seat 3 by means of epoxy resin. The sensor core seat 3 is hermetically and rotationally fixed to the pressure inlet on the sensor housing. The spun gold inner lead wire 15 on the piezoresistive sensitive core body is led into the interposing board 4 of one end of the central hole provided on the sensor core seat via the other end of the central hole on the ring-shape recession surface of the sensor core seat 3, then the spun gold inner lead wire 15 on the piezoresistive sensitive core is led out by an automobile electric device interface 7 via the signal conditioning circuit. As shown in FIG. 5, the interposing board 4 is adhesively bonded to the ring-type recession surface of one end of the central hole on the sensor core seat 3, and is exported by connecting to the signal conditioning circuit board 101 via leading out cable core wire 8.

Figure 4:
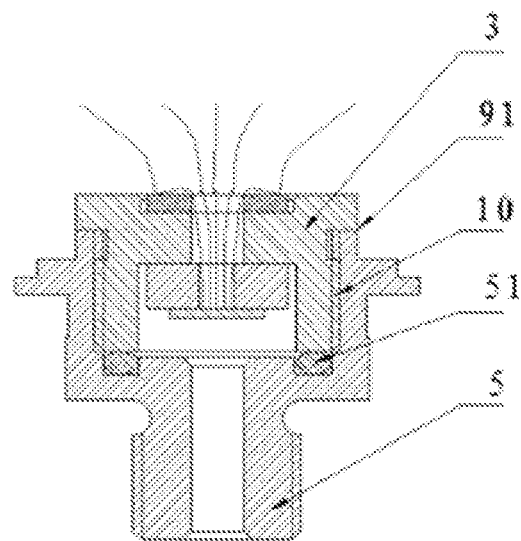
FIG. 4 is a schematic view of the structure of the sensor core and sensor base when assembled of an embodiment of the invention.

As shown in FIG. 4 and FIG. 5, the sensor housing is composed of a sensor base 5 and a sensor shield 6. The sensor shield 6 is rotationally fixed to the sensor base 5 and then an inner cavity is formed. In one embodiment, the sensor core 3, sensor base 5 and the sensor shield are made of stainless steel material. The sensor shield 6 is installed to the automobile electric device interface 7. A stepped hole as a pressure inlet is provided in the middle part of the sensor base 5, and an outer thread of the sensor core 3 is rotationally fixed to the inner thread groove of the stepped hole on the sensor base 5 by means of thread sealant 10. The circumferential surface of the stepped hole has a ring-type recession provided with O-type sealing ring 51. While the sensor core 3 is rotationally fixed to the stepped hole on the sensor base 5, the sensor core seat 3 tightly presses the O-type sealing ring 51 (a fixed-torque spanner can be used for screwing until to be tightly screwed and sealed), and thereby the sealed fixation between the sensor core 3 and sensor base 5 is achieved.

In order to improve the reliability of the sensor, the inner wall of the glass ring sheet 2 and the inner wall of the central hole on the sensor core seat 3 are provided with an adhesive silicone rubber as an insulation surface, at the same time, the ring-shape connection seam 91 between the sensor core seat 3 and the sensor base 5, and the ring-shape connection seam 92 between the sensor base 5 and the sensor shield 6 are welded and sealed by utilizing laser or electron, thus a triple multi-layer sealing structure with high reliability is formed.

A signal conditioning circuit board 101 provided with signal conditioning circuit is fixed to the inner cavity of the sensor. The signal conditioning circuit has a signal amplification circuit, a zero-position and full-scale output conditioning circuit, a zero-position and sensitivity temperature coefficient compensation circuit and a non-linear trim circuit. The measurement range corresponding to the sensor is 0~0.5 MPa to 0~100 MPa, and the diameter and thickness of the silicon film sheet 11 is 2 mm~4 mm, and 0.22~0.91 mm, respectively.

In order to improve the measuring accuracy of the sensor, the sealing property of the structure is especially important, and the sensor shield 6 is rotationally fixed to the automobile electric device interface 7 by means of sealant. The ring-type connection seam 91 between the sensor core seat 3 and the sensor base 5, and the ring-type connection seam 92 between the sensor shield 6 and the sensor base 5 are hermetically welded by means of laser or electron, thus a multi-layer sealing structure with high reliability is formed.

In one embodiment, the glass ring sheet 2 employs Pyrex 7740 or GG-17 glass ring sheet, the Pyrex glass ring is a product from Corning Inc., it is specifically designed for the semiconductor packaging, and has a physical property close to silicon, the substitute made in China is GG-17 borosilicate glass. The Wheatstone bridge part of the silicon piezoresistive sensitive element is made by employing the technical solution disclosed in the Chinese Patent which is titled "A mini dynamic piezoresistive general pressure sensor and a manufacturing method thereof" (Patent No. ZL200310106329.8).

A general pressure sensor for an automobile with low cost, high accuracy, high reliability and long lifetime is created by combining semiconductor plane integrated circuit technique, MEMS technique and digital smart circuit technique in the embodiment described above.

The pressure sensor for an automobile based on the technique of the intention, the main performance indexes of which are:

1) pressure measurement range: 0~0.5 to 0~100 MPa;
2) power supply and signal: power supply 5V DC±0.5, signal is output in any ratio between 0~5V;
3) operating temperature region: −40~125° C. (for long term), −55~135° C. (for four hours);
4) accuracy level: integrated error of A level full operating temperature region is better than 1% FS, and integrated error of B level full operating temperature region is better than 0.5% FS;
5) impact overload resistance capacity: higher than 600% FS;
6) lifetime: $10^7$ times of pressure cycles;
7) year stability: 0.25% FS.

While the present invention has already been described with the preferable embodiments as above, they are not intended to limit the present invention, and any skilled in the art can make a few modifications and improvements without departing form the spirit and scope of the present invention, thus the scope of protection of the present invention should be defined by the claims.

What is claimed is:

1. A general pressure sensor for an automobile comprising a sensor housing, a silicon piezoresistive sensitive core, a sensor core seat, a signal conditioning circuit and an automobile electric device interface, and the silicon piezoresistive sensitive core, the sensor core seat and the signal conditioning circuit are disposed in the inner cavity of the sensor housing, and the sensor housing is installed to the interface of the automobile electric device, wherein, the silicon piezoresistive sensitive core comprises a silicon piezoresistive sensitive element and a glass ring sheet, the silicon piezoresistive sensitive element comprises a silicon film sheet which is, in turn, covered with a silicon oxide layer and a silicon nitride layer on its front surface, the middle part of the front surface of the silicon piezoresistive sensitive element is provided with a Wheatstone bridge, while after the silicon film sheet is exposed in the surrounding part, the silicon piezoresistive sensitive element is welded and fixed to one surface of the glass ring sheet with a thermal expansion coefficient similar to silicon, a strain resistance on the Wheatstone bridge is led out via an inner lead wire, and an insulation oxidation layer is formed on one surface of the glass ring sheet and the silicon piezoresistive sensitive element;

the other surface of the silicon ring sheet is hermetically fixed to a ring-shape recession surface provided on the sensor core seat, the sensor core seat is hermetically and rotationally fixed to a pressure inlet on the sensor housing, the inner lead wire on the silicon piezoresistive sensitive core is led to an interposing board provided on one end of the central hole via the other end of the central hole on the ring-shape recession surface of the sensor core seat, and then the inner lead wire is in turn led out via the signal conditioning circuit by automobile electric device interface;

the sensor housing comprises a sensor base and a sensor shield which is rotationally fixed to the sensor base and then forms the inner cavity, the sensor shield is installed to the automobile electric device interface, the middle part of the sensor base has a stepped hole as the pressure inlet, and the sensor core seat is rotationally fixed to the stepped hole on the sensor base by means of thread sealant.

2. The general pressure sensor for an automobile of claim 1, wherein a circumferential surface of the stepped hole has a ring-type recession, the ring-type recession is provided with an O-type sealing ring, while the sensor core seat is rotationally fixed to the stepped hole on the sensor base, the sensor core seat tightly presses the O-type sealing ring.

3. The general pressure sensor for an automobile of claim 2, wherein a signal conditioning circuit board provided with the signal conditioning circuit is fixed to the inner cavity of the sensor housing, the signal conditioning circuit has a signal amplification circuit, a zero-position and full-scale output conditioning circuit, a zero-position and sensitivity temperature coefficient compensation circuit and a non-linear trim circuit.

4. The general pressure sensor for an automobile of claim 2, wherein the pressure measuring range of the sensor is 0~0.5 MPa to 0~100 MPa.

5. The general pressure sensor for an automobile of claim 2, wherein the diameter and thickness of the sensor is 2 mm~4 mm and 0.22 mm~0.91 mm, respectively.

6. The general pressure sensor for an automobile of claim 2, wherein the inner wall of the glass ring sheet and the inner wall of the central hole on the sensor core seat are provided with an adhesive silicone rubber as an insulation surface.

7. The general pressure sensor for an automobile of claim 2, wherein the sensor shield is rotationally fixed to the automobile electric device interface by means of sealant, and a ring-type connection seam between the sensor core seat and the sensor base, a ring-type connection seam between the sensor shield and the sensor base are hermetically welded by means of laser or electron beam.

8. The general pressure sensor for an automobile of claim 2, wherein the sensor core seat, the sensor base and the sensor shield are made of stainless steel material.

9. The general pressure sensor for an automobile of claim 2, wherein the glass ring sheet employs Pyrex 7740 or GG-17 glass ring sheet.

10. The general pressure sensor for an automobile of claim 1, wherein a signal conditioning circuit board provided with the signal conditioning circuit is fixed to the inner cavity of the sensor housing, the signal conditioning circuit has a signal amplification circuit, a zero-position and full-scale output conditioning circuit, a zero-position and sensitivity temperature coefficient compensation circuit and a non-linear trim circuit.

11. The general pressure sensor for an automobile of claim 1, wherein the pressure measuring range of the sensor is 0~0.5 MPa to 0~100 MPa.

12. The general pressure sensor for an automobile of claim 1, wherein the diameter and thickness of the sensor is 2 mm~4 mm and 0.22 mm~0.91 mm, respectively.

13. The general pressure sensor for an automobile of claim 1, wherein the inner wall of the glass ring sheet and the inner wall of the central hole on the sensor core seat are provided with an adhesive silicone rubber as an insulation surface.

14. The general pressure sensor for an automobile of claim 1, wherein the sensor shield is rotationally fixed to the automobile electric device interface by means of sealant, and a ring-type connection seam between the sensor core seat and the sensor base, a ring-type connection seam between the sensor shield and the sensor base are hermetically welded by means of laser or electron beam.

15. The general pressure sensor for an automobile of claim 1, wherein the sensor core seat, the sensor base and the sensor shield are made of stainless steel material.

16. The general pressure sensor for an automobile of claim 1, wherein the glass ring sheet employs Pyrex 7740 or GG-17 glass ring sheet.

* * * * *

UNITED STATES PATENT AND TRADEMARK OFFICE
CERTIFICATE OF CORRECTION

PATENT NO. : 8,459,124 B2
APPLICATION NO. : 13/105261
DATED : June 11, 2013
INVENTOR(S) : Wang et al.

It is certified that error appears in the above-identified patent and that said Letters Patent is hereby corrected as shown below:

On Title page, item [73], Assignees, after "Kunshan Shuangqiao Sensor Measurement Controlling Co., Ltd.", substitute "Zhouzhuang (CN)" with -- Jiangsu (CN) --

On Title page, item [73], Assignees, insert after "Kunshan Shuangqiao Sensor Measurement Controlling Co., Ltd., Jiangsu (CN)" -- Shanghai Wenxiang Automotive Sensors Co., Ltd., Shanghai (CN) --

Signed and Sealed this
Eighth Day of April, 2014

Michelle K. Lee
*Deputy Director of the United States Patent and Trademark Office*